US012489157B2

(12) United States Patent
Hong et al.

(10) Patent No.: US 12,489,157 B2
(45) Date of Patent: Dec. 2, 2025

(54) BATTERY PACK THERMAL MANAGEMENT SYSTEM

(71) Applicant: UIF (University Industry Foundation), Yonsei University, Seoul (KR)

(72) Inventors: Jong Sup Hong, Seoul (KR); Kyeong Jun Baek, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 682 days.

(21) Appl. No.: 17/827,074

(22) Filed: May 27, 2022

(65) Prior Publication Data

US 2022/0384881 A1 Dec. 1, 2022

(30) Foreign Application Priority Data

May 28, 2021 (KR) .................. 10-2021-0068938
May 17, 2022 (KR) .................. 10-2022-0060465

(51) Int. Cl.
*H01M 10/6569* (2014.01)
*H01M 10/625* (2014.01)
(Continued)

(52) U.S. Cl.
CPC ..... *H01M 10/6569* (2015.04); *H01M 10/625* (2015.04); *H01M 10/635* (2015.04); *H01M 10/6556* (2015.04)

(58) Field of Classification Search
CPC ........... H01M 10/6569; H01M 10/625; H01M 10/635; H01M 10/6556; Y02E 60/10
See application file for complete search history.

(56) References Cited

U.S. PATENT DOCUMENTS 6,138,466 A * 10/2000 Lake .................. B60H 1/00392
62/238.7
2016/0204488 A1* 7/2016 Arai .................. B60H 1/00278
429/62
(Continued)

FOREIGN PATENT DOCUMENTS

KR 10-1436960 B1 9/2014
KR 10-2016-0046262 A 4/2016
(Continued)

OTHER PUBLICATIONS

KR20160046262A Translated Description (Year: 2016).*
(Continued)

*Primary Examiner* — Matthew T Martin
*Assistant Examiner* — Kevin Song
(74) *Attorney, Agent, or Firm* — Paratus Law Group, PLLC

(57) ABSTRACT

A battery pack thermal management system includes a first circulation line in which a first refrigerant temperature-increased while passing through an electronic sub-assembly passes by a first control valve, dissipates heat in a first heat exchanger, and circulates back to the electronic sub-assembly, a second circulation line in which a second refrigerant circulates through a battery pack, a compressor, and a condenser in this order or through the condenser, the compressor, and the battery pack in this order, and a plurality of valves controlling a flow path along which the second refrigerant flows in the second circulation line. The plurality of valves are capable of temperature-increasing or cooling the battery pack by controlling a flow path along which the second refrigerant flows.

11 Claims, 11 Drawing Sheets

(51) Int. Cl.
*H01M 10/635* (2014.01)
*H01M 10/6556* (2014.01)

(56) References Cited

U.S. PATENT DOCUMENTS

| | | | |
|---|---|---|---|
| 2019/0221899 A1* | 7/2019 | Tomai | H01M 10/613 |
| 2020/0335838 A1* | 10/2020 | Wesner | H01M 10/625 |
| 2021/0016632 A1* | 1/2021 | Oh | B60H 1/00278 |

FOREIGN PATENT DOCUMENTS

| | | | |
|---|---|---|---|
| KR | 20160046262 A | * | 4/2016 |
| KR | 10-2017-0012619 A | | 2/2017 |
| KR | 10-2019-0006438 A | | 1/2019 |
| KR | 10-2183499 B1 | | 11/2020 |

OTHER PUBLICATIONS

KR-20160046262-A Translation (Year: 2016).*
Korean Office Action for related KR Application No. 10-2022-0060465 mailed Sep. 23, 2024 from Korean Intellectual Property Office.
Daniel Leighton, "Combined Fluid Loop Thermal Management for Electric Drive Vehicle Range Improvement", SAE International, Apr. 14, 2015, pp. 1-10, vol. 8, Issue 2.

* cited by examiner

FIG. 2

BATTERY PACK THERMAL MANAGEMENT SYSTEM

CROSS-REFERENCE TO RELATED APPLICATIONS

The present application claims priority to Korean Patent Application Nos. 10-2021-0068938 filed on May 28, 2021 and 10-2022-0060465 filed May 17, 2022, which are all hereby incorporated by reference in their entirety.

BACKGROUND

The present disclosure relates to a system capable of performing thermal management on a battery pack using a technique of indirect heat exchange caused by air circulation.

Usually, it is important that chargeable and discharble batteries mounted in environment-friendly vehicles maintain a target temperature regardless of a surrounding environment (for example, lithium-ion batteries have a target temperature of 20 to 30° C.) and thus maintain optimal performance and efficiency. To this end, there is a need for a battery thermal management system. The environment-friendly vehicles here include an electric vehicle and a hybrid vehicle. To this end, the battery thermal management systems are divided into systems using an air-cooling-type cooling apparatus that cools a battery using in-vehicle air and systems using a water-cooling-type cooling apparatus that cools a battery using a coolant. As an example, the battery thermal management system that employs a technique of using the air-cooling-type apparatus finds application in small-sized electric vehicles and hybrid vehicles. In contrast, in a case where a high-voltage battery supplying electric power to an electric motor (that is, a drive motor) is used, the battery thermal management system that employs a technique of using the water-cooling-type cooling apparatus is changed to a chiller-type battery thermal management system in which the water-cooling-type cooling apparatus and a roof-on air conditioner are combined with each other. Thus, the effect of cooling the battery is increased. Particularly, in the chiller-type battery thermal management system, a radiator mode in which a coolant is caused to circulate through a radiator of an engine cooling system and a chiller mode (or an air conditioning mode) in which a roof-on air conditioner is caused to operate is entered according to a condition for temperature of outside air, and thus cooling may be performed.

The foregoing is intended merely to aid in the understanding of the background of the present disclosure, and is not intended to mean that the present disclosure falls within the purview of the related art that is already known to those skilled in the art.

SUMMARY

In the battery pack thermal management system in the related art, a coolant loop for thermal management and a coolant loop for an in-vehicle passenger space are each required to be configured with a separate pump and coolant, and direct combined heat and power in a refrigerant loop is required. Thus, the degree of complexity of the entire system can be increased, and pressure loss by the refrigerant loop occurs due to a direct combined heat and power in a cooling loop for an electronic sub-assembly.

An objective of the present disclosure is to provide a battery back thermal management system capable of recovering waste heat using various methods while concurrently decreasing the degree of complexity of the system. In this system, unnecessary pressure loss by a refrigerant circulation line can be minimized using a technique of indirect combined heat and power.

In order to accomplish the above-mentioned objective, according to an aspect of the present disclosure, there is provided a battery pack thermal management system including: a first circulation line in which a first refrigerant temperature-increased while passing through an electronic sub-assembly passes by a first control valve, dissipates heat in a first heat exchanger, and circulates back to the electronic sub-assembly; a second circulation line in which a second refrigerant circulates through a battery pack, a compressor, and a condenser in this order or through the condenser, the compressor, and the battery pack in this order; and a plurality of valves controlling a flow path along which the second refrigerant flows in the second circulation line, wherein the plurality of valves are capable of temperature-increasing or cooling the battery pack by controlling a flow path along which the second refrigerant flows.

In the battery pack thermal management system, the plurality of valves may include a second control valve, a first opening and closing valve, a second opening and closing valve, a third opening and closing valve, and a first expansion valve, the second control valve may allow the second refrigerant to flow from the compressor to the battery pack, the first opening and closing valve may allow the second refrigerant to flow from the compressor to the condenser, the second opening and closing valve may allow the second refrigerant to flow from the condenser to the compressor, the third opening and closing valve may allow the second refrigerant to flow from the battery pack to the compressor, and the first expansion valve may be positioned between the condenser and the battery pack.

In the battery pack thermal management system, when the first opening and closing valve, the third opening and closing valve, and the first expansion valve are opened, the battery pack is cooled, and when the second opening and closing valve and the second control valve are opened, the battery pack is temperature-increased.

In the battery pack thermal management system, a first branch line branching off from the first control valve may be included in the first circulation line, and, in the first branch line, the first refrigerant may pass by a heat exchanger and may circulate through the electronic sub-assembly.

In the battery pack thermal management system, a second branch line branching off from the second control valve may be included in the second circulation line, and, in the second branch line, the second refrigerant may pass by the evaporator.

The battery pack thermal management system according to the present disclosure is configured to include two types of refrigerant circulation lines. Thus, the degree of complexity of the system can be decreased, and various modes can be realized. Consequently, residual heat can be recovered using various methods, and unnecessary pressure loss by the refrigerant circulation line can be minimized using a technique of indirect combined heat and power.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 2 is a table showing modes that are capable of be realized with the battery pack thermal management system according to the present disclosure;

DETAILED DESCRIPTION

Figure 1:
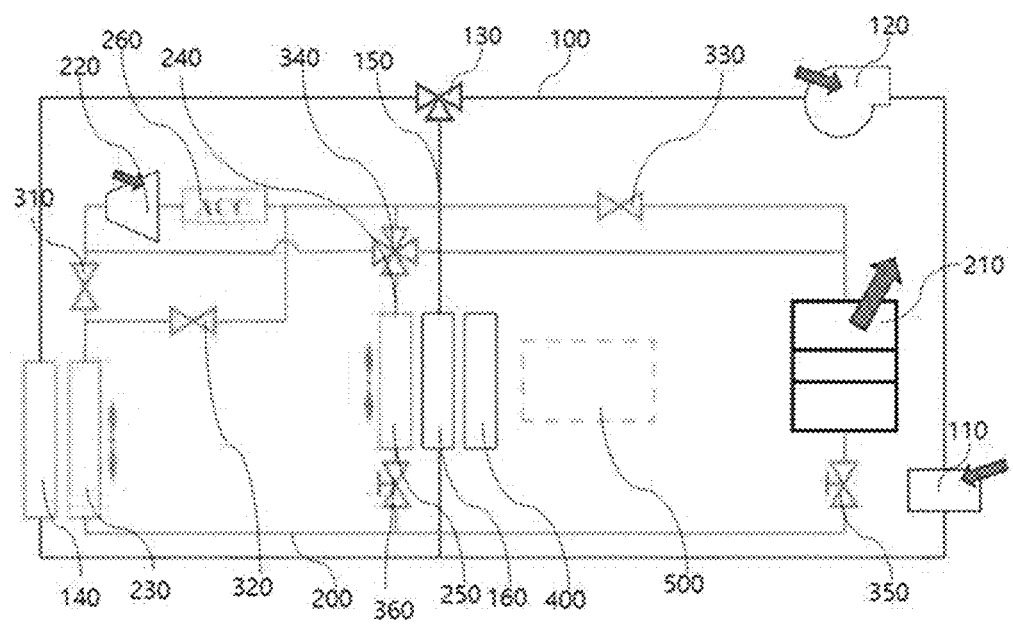
FIG. 1 is a view schematically illustrating a configuration of a battery pack thermal management system according to the present disclosure.

A specific embodiment of the present disclosure will be described in detail below with reference to the drawings. Various modifications can be made to the specific embodiment, and thus various embodiments can be constructed. However, this description of the specific embodiment is not intended to limit the present disclosure thereto. All alterations, equivalents, and substitutes that are included within the scope of the technical idea and technology that are described below and should be understood as falling within the scope of the present disclosure.

The same reference numeral refers to the same constituent element in the drawings.

Throughout the specification, unless specifically defined otherwise, the expression like "an apparatus includes, contains, or has a constituent element" means that an apparatus may further include a different constituent element.

The terms first, second, and so on are used throughout in order to distinguish one constituent element to another and do not impose any limitation on meanings of these constituent elements.

When a constituent element, such as a layer or a film, is described as being present over/above or under/below a different constituent element, this means that the former constituent element may be present over/above or under/below the later constituent element with a third constituent elements in between. Furthermore, when a constituent element is described as being present on the "top" or "bottom" of a different constituent element, this means that the former constituent element is in contact with an upper surface or a lower surface of the later constituent element without a third constituent element in between.

FIG. 1 is a view schematically illustrating a configuration of a battery pack thermal management system according to an embodiment of the present disclosure. With reference to FIG. 1, a battery pack thermal management system 10 includes a first circulation line 100, a second circulation line 200, a plurality of valves 300, the electric heater 400, and an in-vehicle passenger space 500.

In various embodiments, the first circulation line 100 may include an electronic sub-assembly 110, a first compressor 120, a first control valve 130, a first heat exchanger 140, a first branch line 150, and a second heat exchanger 160.

In the various embodiments, the second circulation line 200 may include a battery pack 210, a second compressor 220, a condenser 230, a second branch line 240, an evaporator 250, and an accumulator (ACC) 260.

In the various embodiments, the plurality of valves 300 may include a first opening and closing valve 310, a second opening and closing valve 320, a third opening and closing valve 330, a second control valve 340, a first expansion valve 350, and a second expansion valve 360.

Figure 2:
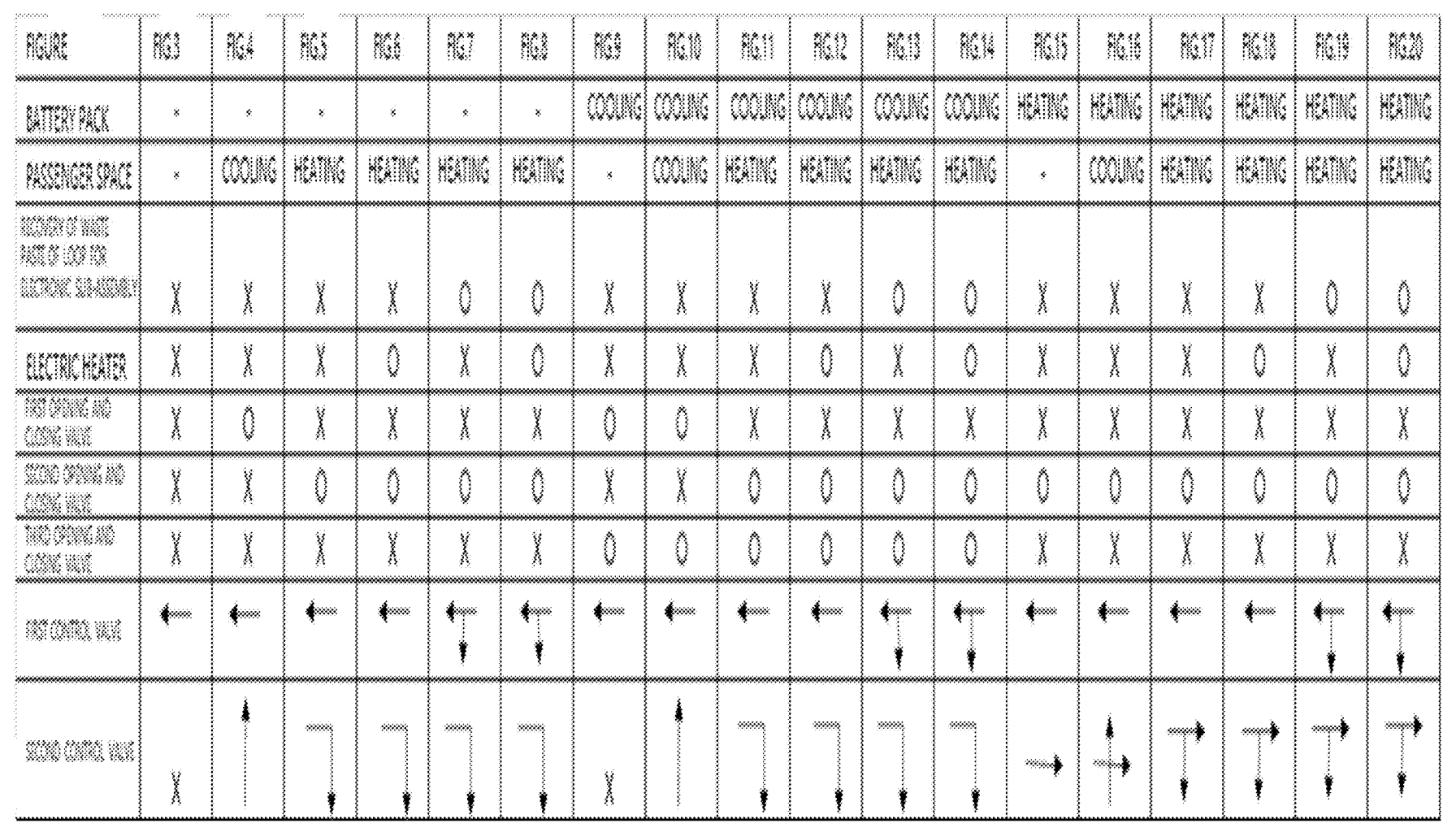

From FIG. 2, modes that, in the various embodiments, are possibly realized by the battery pack thermal management system can be known.

With reference to FIG. 2, in embodiments illustrated in FIGS. 3 to 8, cooling or temperature-increasing may not be performed on the battery pack. In a case where a particular operation is not performed to adjust temperature of the in-vehicle passenger space 500, this corresponds to the embodiment in FIG. 3. In a case where the in-vehicle passenger space 500 is cooled, this corresponds to the embodiment in FIG. 4. In a case where the in-vehicle passenger space 500 is air-heated, this corresponds to the embodiments in FIGS. 5, 6, 7, and 8.

With reference to FIG. 2, in embodiments illustrated in FIGS. 9 to 14, cooling may be performed on the battery pack. In the case where a particular operation is not performed to adjust the temperature of the in-vehicle passenger space 500, this corresponds to the embodiment in FIG. 9. In the case where the in-vehicle passenger space 500 is cooled, this corresponds to the embodiment in FIG. 10. In the case where the in-vehicle passenger space 500 is air-heated, this corresponds to the embodiments in FIGS. 11, 12, 13, and 14.

With reference to FIG. 2, in embodiments illustrated in FIGS. 15 to 20, temperature-increasing (air heating) may be performed on the battery pack. In the case where a particular operation is not performed to adjust the temperature of the in-vehicle passenger space 500, this corresponds to the embodiment in FIG. 15. In the case where the in-vehicle passenger space 500 is cooled, this corresponds to the embodiment in FIG. 16. In the case where the in-vehicle passenger space 500 is air-heated, this corresponds to the embodiments in FIGS. 17, 18, 19, and 20.

In the various embodiments illustrated in FIGS. 7, 8, 13, 14, 19, and 20, waste heat can be recovered in a loop for an electronic sub-assembly, and the recovered waste heat may be used to air-heat the in-vehicle passenger space 500. The recovering of the waste heat in the loop for the electronic sub-assembly may increase the thermal efficiency of a vehicle and may decrease energy waste therein.

In the various embodiments, according to temperature of outside air, air cooling or air heating may be performed on the in-vehicle passenger space 500, and air cooling or air heating may be performed on the battery pack 210.

In an embodiment, in a case where the temperature of the outside air is 20 degrees or higher Celsius, air cooling may be performed on the in-vehicle passenger space 500. Furthermore, in a case where the temperature of the outside air is less than 20 degrees Celsius, air cooling may not be performed on the in-vehicle passenger space 500. In a case where the temperature of the outside air is minus 7 degrees or lower Celsius, air heating may be performed on the in-vehicle passenger space 500. In a case where the temperature of the outside air is more than minus 7 degrees Celsius, air heating may not be performed on the in-vehicle passenger space 500.

In an embodiment, in a case where the temperature of the in-vehicle passenger space 500 is 20 degrees or higher Celsius, air cooling may be performed on the in-vehicle passenger space 500. Furthermore, in a case where the temperature of the in-vehicle passenger space 500 is less than 20 degrees Celsius, air cooling may not be performed on the in-vehicle passenger space 500. In a case where the temperature of the in-vehicle passenger space 500 is minus 7 degrees or lower Celsius, air heating may be performed on the in-vehicle passenger space 500. In a case where the temperature of the in-vehicle passenger space 500 is more than minus 7 degrees Celsius, air heating may not be performed on the in-vehicle passenger space 500.

In an embodiment, in a case where the temperature of the outside air is 15 degrees or higher Celsius, air cooling (cooling) may be performed on the battery pack 210. Furthermore, in a case where the temperature of the outside air is less than 15 degrees Celsius, air heating (temperature-increasing) may be performed on the battery pack 210.

In an embodiment, in a case where temperature of the battery pack 210 is 15 degrees or higher Celsius, air cooling (cooling) may be performed on the battery pack 210. Furthermore, in a case where the temperature of the battery pack 210 is less than 15 degrees Celsius, air heating (temperature-increasing) may be performed on the battery pack 210.

The embodiments in FIGS. 3 to 20 will be described below with reference to FIGS. 1 and 2.

Figure 3:
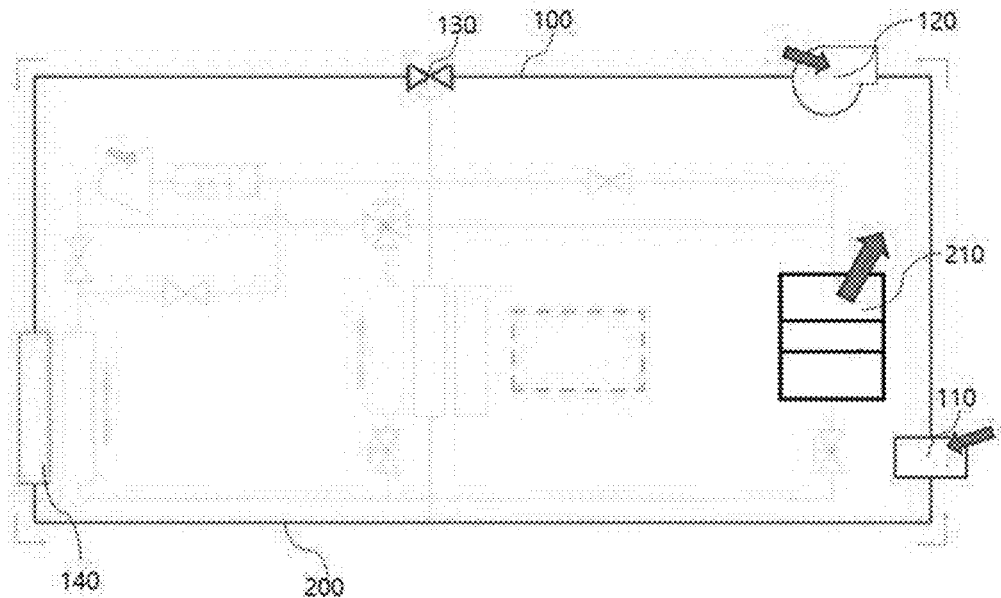
FIGS. 3 to 8 are views each illustrating a first circulation line and a second circulation line for air-cooling or air-heating an in-vehicle passenger space using the battery pack thermal management system according to the present disclosure.
Figure 20:
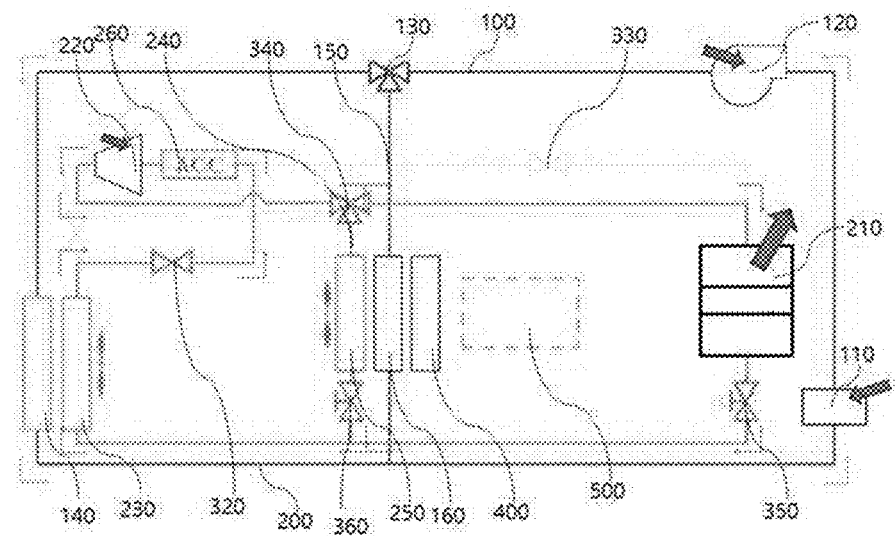

For reference, cases where the electronic sub-assembly 110 is cooled are illustrated in FIGS. 3 and 20.

In the various embodiments, the first circulation line 100 may include the electronic sub-assembly 110, the first compressor 120, the first control valve 130, the first heat exchanger 140, the first branch line 150, and the second heat exchanger 160.

The first circulation line 100 may be a flow path along which a first refrigerant R1 flows to cool the electronic sub-assembly 110 that emits heat. The first refrigerant R1 may flow along the first circulation line 100. The first refrigerant R1 may circulate through the electronic sub-assembly 110, the first compressor 120, the first control valve 130, and the first heat exchanger 140 in this order. A circulation loop for the first refrigerant R1 is as follows. The first refrigerant R1 may be temperature-increased while passing through the electronic sub-assembly 110 that emits heat. Then, with the first compressor 120, the first refrigerant R1 may obtain a motive force for circulating in the first circulation line 100, or the first refrigerant R1 may be compressed. Then, the first refrigerant R1 emits the absorbed heat in the first heat exchanger 140 after passing through the first control valve 130 and then flows back to the electronic sub-assembly 110.

The first heat exchanger 140 may be an apparatus that is positioned in a vehicle bonnet and exchanges heat with the outside. The first heat exchanger 140 may be a radiator or a condenser according to what type of the first refrigerant R1 is used. In a case where the first refrigerant R1 is a coolant containing one or both of water and ethylene glycol, the first heat exchanger 140 may be a radiator. In a case where the first refrigerant R1 is a refrigerant instead of a coolant, the first heat exchanger 140 may be a condenser that is capable of condensing the first refrigerant R1. In a case where the first refrigerant R1 is a refrigerant instead of a coolant, an expansion valve (not illustrated) may be arranged in the first circulation line 100.

In this manner, the circulation of the first refrigerant R1 through the electronic sub-assembly 110, the first compressor 120, the first control valve 130, and the first heat exchanger 140 in this order may cool the electronic sub-assembly 110.

Figure 4:
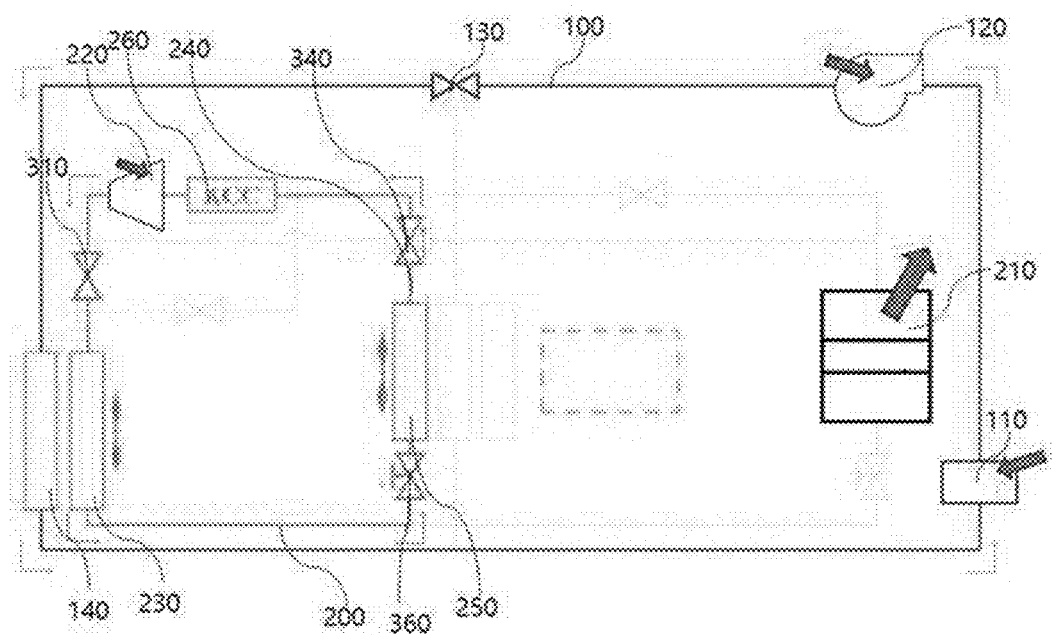

FIG. 4 illustrates the embodiment illustrated in FIG. 3 and an embodiment where the in-vehicle passenger space 500 that further includes the second circulation line 200 is air-cooled (cooled).

In the embodiment in FIG. 4, the second circulation line 200 may include the battery pack 210, the second compressor 220, the condenser 230, the second branch line 240, the evaporator 250, and the accumulator 260.

The second circulation line 200 may be a flow path along which a second refrigerant R2 circulates from the evaporator 250 to the second compressor 220, then from the second compressor 220 to the condenser 230 and then from the condenser 230 back to the evaporator 250. This circulation of the second refrigerant R2 in the second circulation line 200 may cool the in-vehicle passenger space 500.

The first circulation line 100 may be for a process in which the first refrigerant R1 to which the heat occurring in the electronic sub-assembly 110 is transferred is cooled in the first heat exchanger 140 and then circulates back to the electronic sub-assembly 110. The first control valve 130 may close a flow path toward the first branch line 150 and thus may block the first refrigerant R1 from flowing toward the in-vehicle passenger space 500. In the second circulation line 200, the first opening and closing valve 310, the second expansion valve 360, and the second control valve 340 may be opened. Thus, the second refrigerant R2 passing through the second compressor 220 flows through the condenser 230, is expanded in the second expansion valve 360, and then passes through the evaporator 250. Thus, the in-vehicle passenger space 500 can be air-cooled. In the evaporator 250, the second control valve 340 opens only a flow path toward the second compressor 220. The second opening and closing valve 320, the third opening and closing valve 330, and the first expansion valve 350 are closed, and thus the second circulation line 200 may be allowed to air-cool only the in-vehicle passenger space.

Figure 10:
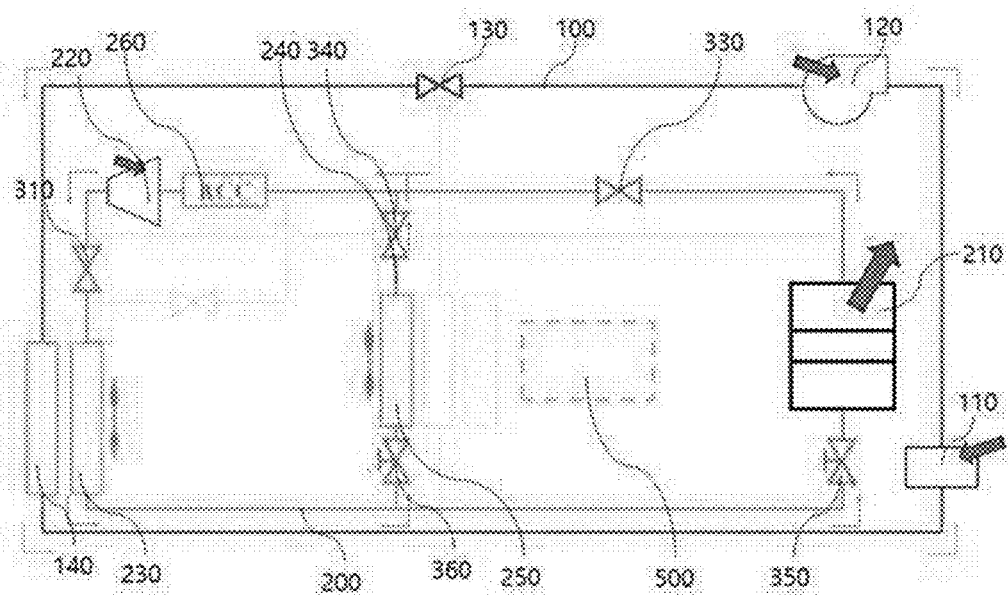

The embodiment of the second circulation line 200 that is illustrated in FIG. 4 is similar to the embodiment of the second circulation line 200 illustrated in FIG. 10.

Figure 5:
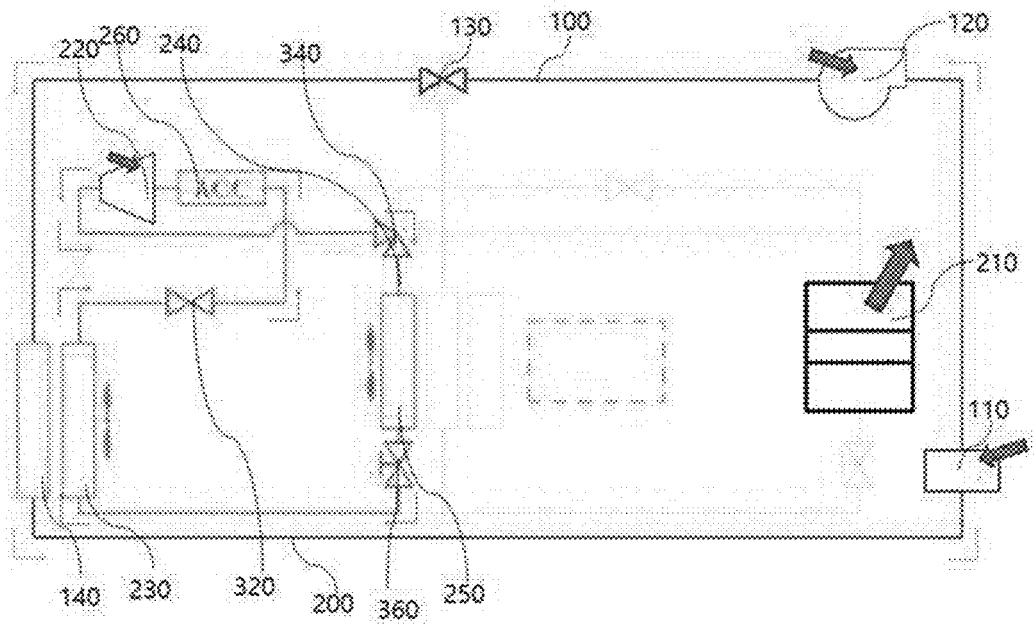
Figure 6:
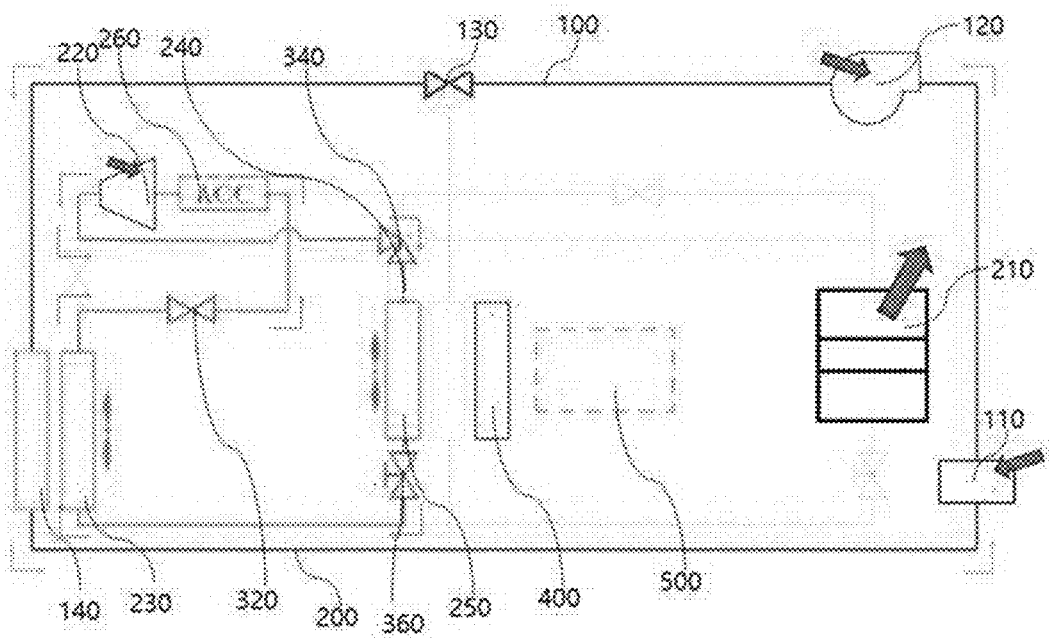

FIGS. 5 and 6 illustrate the embodiment illustrated in FIG. 3 and an embodiment where the in-vehicle passenger space 500 that further includes the second circulation line 200 is air-heated.

With reference to FIG. 5, the second refrigerant R2 may circulate from the second compressor 220 to the evaporator 250, then from the evaporator 250 to the condenser 230, and then from the condenser 230 back to the second compressor 220. The second control valve 340 may open the second branch line 240 and may guide the second refrigerant R2 passing through the second compressor 220 in flowing toward the evaporator 250. Furthermore, in the evaporator 250, the high-temperature second refrigerant R2 may be utilized for air-heating the in-vehicle passenger space 500. The second opening and closing valve 320, the second control valve 340, and the second expansion valve 360 may be opened, and the first opening and closing valve 310, the third opening and closing valve 330, and the first expansion valve 350 may be closed.

With reference to FIG. 6, in addition to using the second circulation line 200, an electric heater 400 may be operated in order to air-heat the in-vehicle passenger space 500.

Figure 7:
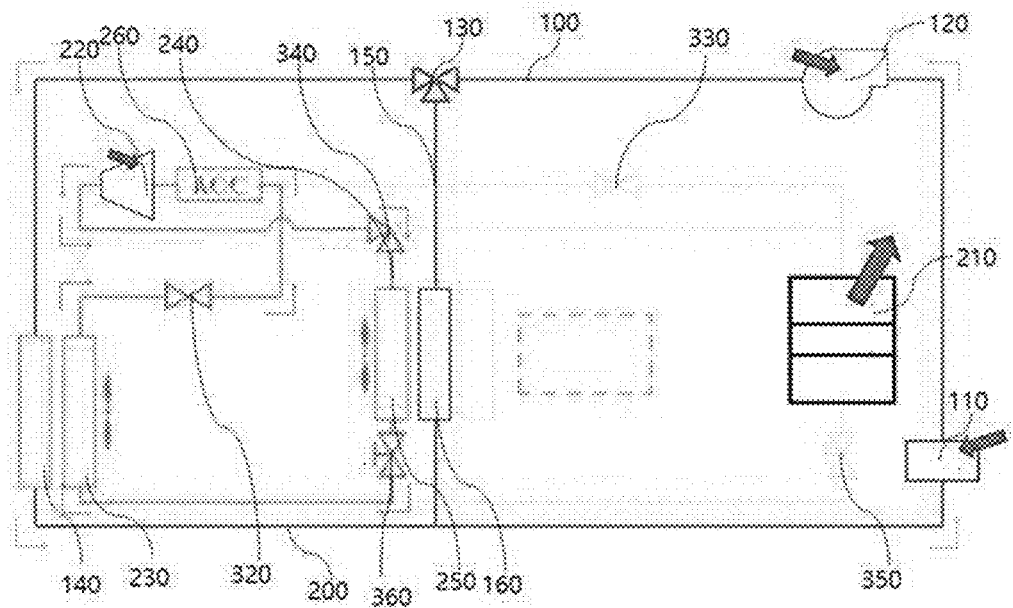
Figure 8:
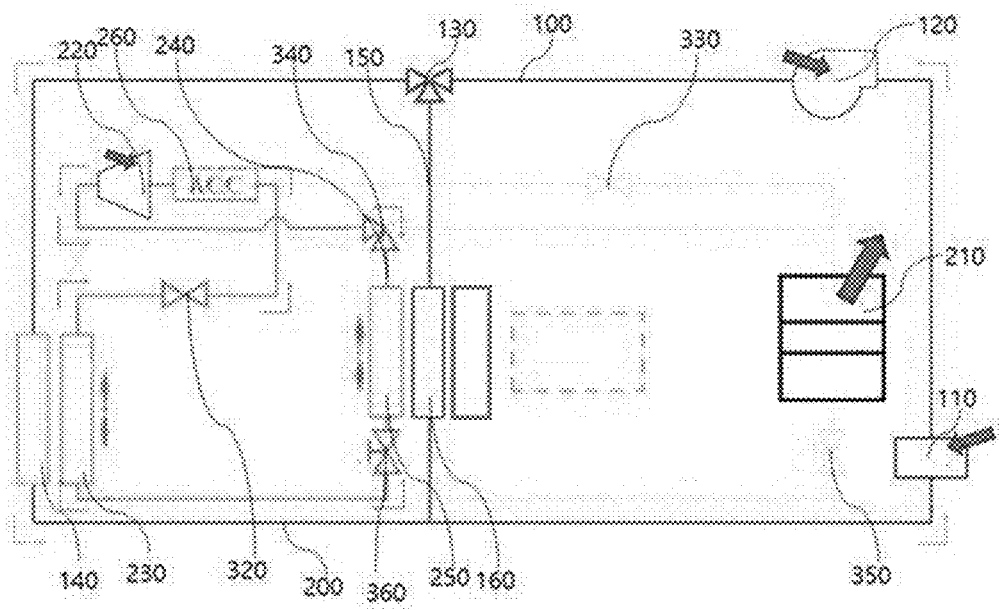

FIG. 7 illustrates the embodiment illustrated in FIG. 5 and an embodiment where the in-vehicle passenger space 500 that further includes the first branch line 150 is air-heated. FIG. 8 illustrate the embodiment illustrated in FIG. 6 and the embodiment where the in-vehicle passenger space 500 that further includes the first branch line 150 is air-heated.

With reference to FIGS. 7 and 8, the first circulation line 100 may further include the first branch line 150 branching off from the first control valve 130. The second heat exchanger 160 may be arranged in the first branch line 150. The second heat exchanger 160 may transfer heat of the high-temperature first refrigerant R1 to the in-vehicle passenger space 500. Thus, waste heat occurring in the electronic sub-assembly 110 may be utilized to air-heat the in-vehicle passenger space 500. That is, the waste heat occurring in the electronic sub-assembly 110 may be utilized to air-heat the in-vehicle passenger space 500 without being dissipated to the outside.

The first control valve 130 may open and close a flow path in such a manner as to allow the first refrigerant R1 to flow toward the first branch line 150. When the temperature of the outside is low, the first control valve 130 may open a flow path toward the first branch line 150, and thus the in-vehicle passenger space 500 may be air-heated.

FIGS. 7 and 8 illustrate a method of air-heating the in-vehicle passenger space by utilizing the second circulation line and the first circulation line. In the second circulation line, as illustrated in FIGS. 5 and 6, the second opening and closing valve 320, the second control valve 340, and the second expansion valve 360 may be opened, and the first opening and closing valve 310, the third opening and closing valve 330, and the first expansion valve 350 may be closed. In the first circulation line 100, the first control valve 130 may open the first branch line 150, and the second heat exchanger 160 arranged in the first branch line 150 may air-heat the in-vehicle passenger space 500. In addition, the second heat exchanger 160 and the evaporator 250 may indirectly exchange heat with each other using a technique of air circulation. Thus, loss of pressure by the first refrigerant R1 and the second refrigerant R2 can be minimized more than in a technique of direct heat exchange. The in-vehicle passenger space 500 may be air-heated through the electric heater 400.

FIGS. 9 to 14 illustrate the embodiment of the second circulation line 200 for cooling the battery pack 210.

With reference to FIGS. 9 to 14, according to a circulation direction in the second circulation line 200 and/or according to whether the plurality of valves 300 are opened or closed, through the second circulation line 200, the battery pack 210 may be cooled (the embodiments in FIGS. 9 to 14) or temperature-increased (FIGS. 15 to 20), and the in-vehicle passenger space 500 may be air-cooled or air-heated. Furthermore, heat exchange with the second heat exchanger 160 in the first branch line 150 can also be performed.

The second circulation line 200 may further include the accumulator 260. After a process of evaporating the refrigerant R2, the accumulator 260 may cause some residual liquid refrigerant to absorb heat inside the vehicle bonnet and then to be evaporated and may transfer the resulting refrigerant to the second compressor 220. The accumulator 260 may be arranged, in a state of being connected to the second compressor 220, on the second circulation line 200 in such a manner that the refrigerant R2 passes through the accumulator 260 and flows into the second compressor 220.

The plurality of valves 300 is for controlling a flow path along which the second refrigerant R2 flows in the second circulation line 200, and may include the first opening and closing valve 310, the second opening and closing valve 320, the third opening and closing valve 330, the second control valve 340, the first expansion valve 350, and the second expansion valve 360.

The second control valve 340 may allow the second refrigerant R2 to flow along a flow path formed in the direction from the second compressor 220 to the battery pack. The second control valve 340, as a direction control valve, may allow the second refrigerant R2 passing through the second compressor 220 to flow toward the evaporator 250 or may allow the second refrigerant R2 passing through the second compressor 220 to flow in two directions, one toward the evaporator 250 and the other toward the battery pack 210. In addition, the second refrigerant R2 passing through the evaporator 250 may be allowed to flow toward the second compressor 220. In addition, the second refrigerant R2 passing through the evaporator 250 may be allowed to flow toward the second compressor 220 and, at the same time, the second refrigerant R2 passing through the second compressor 220 may be allowed to flow into the battery pack 210.

The first opening and closing valve 310 may allow the second refrigerant R2 to flow along a flow path formed in the direction from the second compressor 220 to the condenser.

The second opening and closing valve 320 may allow the second refrigerant R2 to flow along a flow path formed in the direction from the condenser to the second compressor 220.

The third opening and closing valve 330 may allow the second refrigerant R2 to flow along a flow path formed in the direction from the battery pack to the second compressor 220.

The first expansion valve 350 may be a valve that is arranged on a flow path connecting the condenser 230 and the battery pack 210 to each other. The first expansion valve 350 expands and thus cools the high-voltage second refrigerant R2 passing through the condenser 230 and may allow the cooled second refrigerant R2 to flow along a flow path passing by the battery pack 210.

No limitation is imposed on the first refrigerant R1 and the second refrigerant R2. However, for example, the first refrigerant R1 and the second refrigerant R2 may be a liquid containing at least one of water, ethylene glycol, air ammonia, R-22, R410a, R-12, and R-134a.

Figure 9:
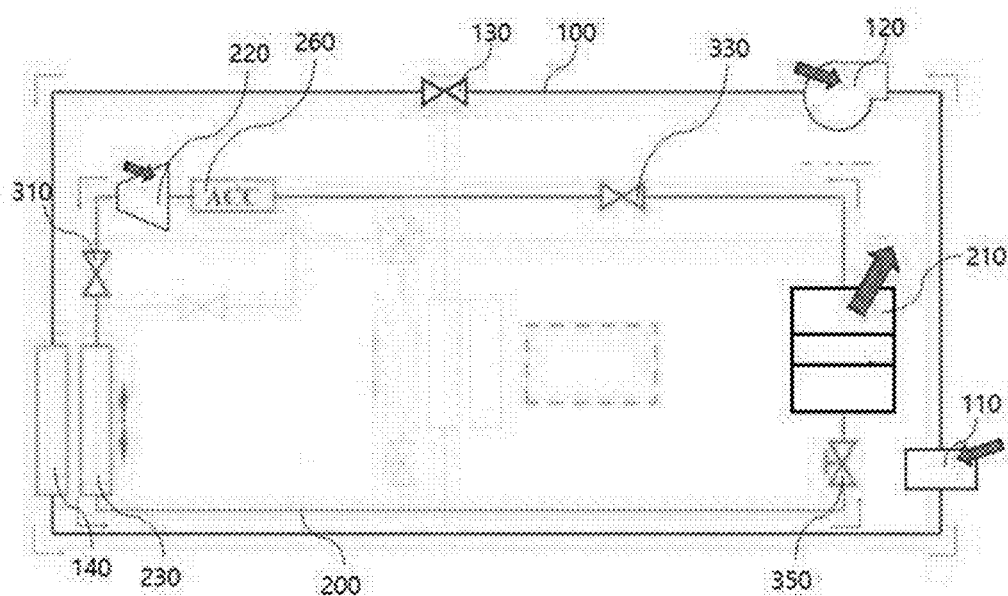
FIGS. 9 to 14 are views each illustrating the first circulation line and the second circulation line for air-cooling a battery pack using the battery pack thermal management system according to the present disclosure.

FIG. 9 illustrates the first circulation line 100 through which the electronic sub-assembly 110 may be cooled and the second circulation line 200 through which the battery pack 210 may be cooled.

The first circulation line 110 through which the electronic sub-assembly 110 may be cooled is the same as the embodiment of the first circulation line 110 illustrated in FIG. 3, and thus a description thereof is omitted.

With reference to FIG. 9, a flow path for cooling the battery pack 210 in the second circulation line 200 may be a flow path along which the second refrigerant R2 circulates from the battery pack 210 to the second compressor 220, then from the second compressor 220 to the condenser 230, and then from the condenser 230 back to the battery pack 210. In this case, the plurality of valves 300 may form a flow path in the second circulation line 200 in which the first opening and closing valve 310, the third opening and closing valve 330 and in which the first expansion valve 350 are opened and the second opening and closing valve 320 and the second control valve 340 are closed, and thus may cause the second refrigerant R2 to cool the battery pack 210.

FIG. 10 illustrates the second circulation line 200 through which the electronic sub-assembly 100 may be cooled and through which cooling of the battery pack 210 and air-cooling of the in-vehicle passenger space 500 may be performed at the same time.

The first circulation line 110 through which the electronic sub-assembly 110 may be cooled is the same as the embodiment of the first circulation line 110 illustrated in FIG. 3, and thus the description thereof is omitted.

In the plurality of valves 300, the first opening and closing valve 310, the third opening and closing valve 330, the first expansion valve 350, and the second expansion valve 360 may be opened, and the second opening and closing valve 320 may be closed (refer to FIG. 3).

The second branch line 240 may be included in the second circulation line 200. The second control valve 340 may open a flow path in the second branch line 240. The second control valve 340 and the second expansion valve 360 may be included in the second branch line 240, and the evaporator 250 may be arranged on the second branch line 240.

The second control valve 340 may open the second branch line 240. Thus, a connection from the condenser 230 through the second expansion valve 360 to the evaporator 250 may be established, and a connection from the evaporator 250 through the third opening and closing valve 340 to the second compressor 220 may be established. When the second refrigerant R2 passing through the condenser 230 is expanded while passing through the second expansion valve 360, the second refrigerant R2 is cooled. Therefore, the cooled second refrigerant R2 may air-cool the in-vehicle passenger space 500. The second refrigerant R2 that air-cools the in-vehicle passenger space 500 may pass through the second control valve 340 and may flow into the second compressor 220. The second refrigerant R2 passing through the battery pack 210 passes through the second compressor 220, the condenser 230, and the first expansion valve 350 in this order, and then circulates along a flow path on which the battery pack 210 is arranged. Thus, the battery pack 210 may be cooled.

The second branch line 240 may be used to air-cool or air-heat the in-vehicle passenger space 500 according to a direction in which the second refrigerant R2 flows.

FIGS. 11 to 14 illustrate the second circulation line 200 through which the cooling of the battery pack 210 and the air-heating of the in-vehicle passenger space 500 may be performed at the same time.

Among the plurality of valves 300, the second opening and closing valve 320, the third opening and closing valve 330, the first expansion valve 350, and the second expansion valve 360 may be opened, and the first opening and closing valve 310 may be closed. The second control valve may open only a flow path that provides a connection from the second branch line 240 to the second compressor 220 to the evaporator 250.

The second refrigerant R2 passing through the battery pack 210 passes through the second compressor 220, the evaporator 250, and the first expansion valve 350 in this order, and then circulates along the flow path on which the battery pack 210 is arranged. Thus, the battery pack 210 may be cooled.

The second refrigerant R2 cooled while passing through the evaporator 250 passes through the condenser 230 and the second compressor 220 in this order and then circulates along a flow path to the evaporator 250. Thus, the in-vehicle passenger space 500 may be air-heated.

The evaporator 250 arranged in the second branch line 240 may perform indirect heat exchange through circulation of air in the second heat exchanger 160 arranged in the first branch line 150. An air circulation apparatus may be arranged in the second branch line 240 in such a manner as to facilitate indirect heat exchange between the evaporator 250 and the second heat exchanger 160.

Figure 11:
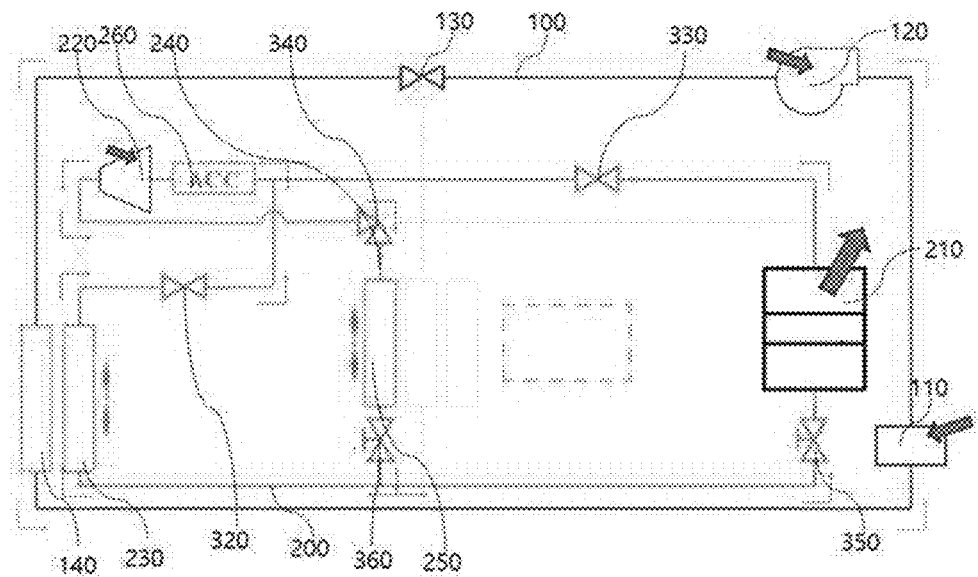
Figure 12:
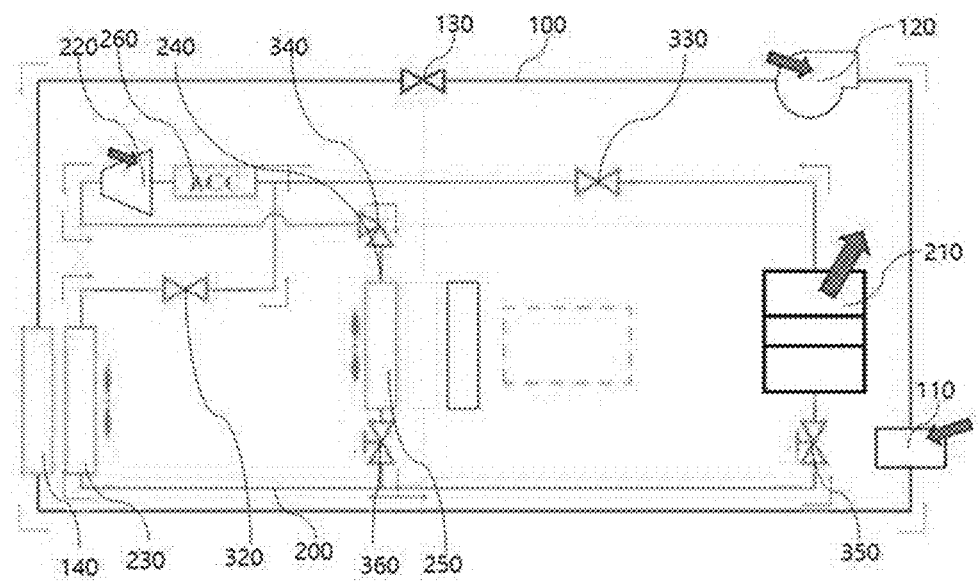
Figure 13:
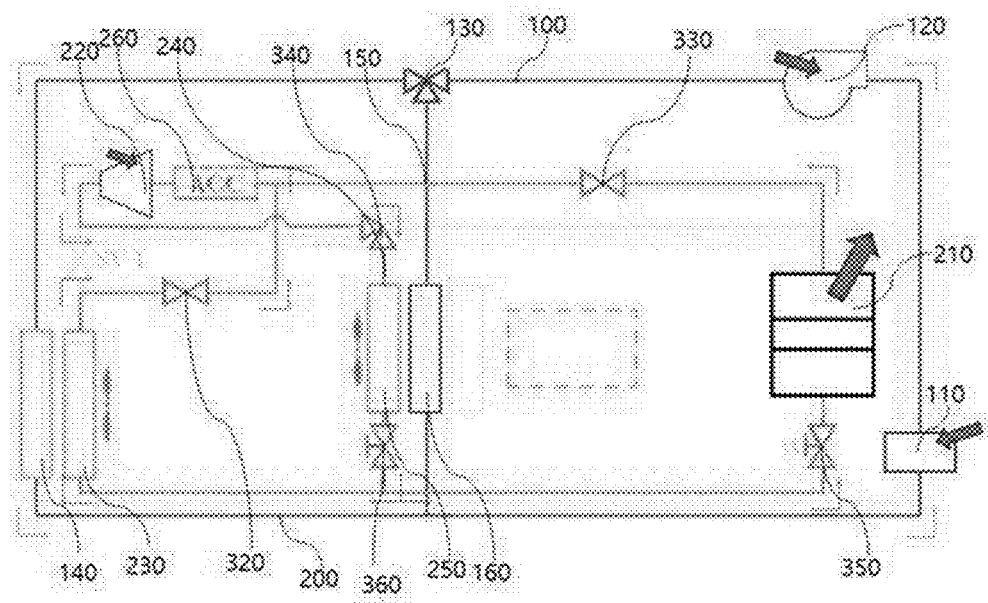
Figure 14:
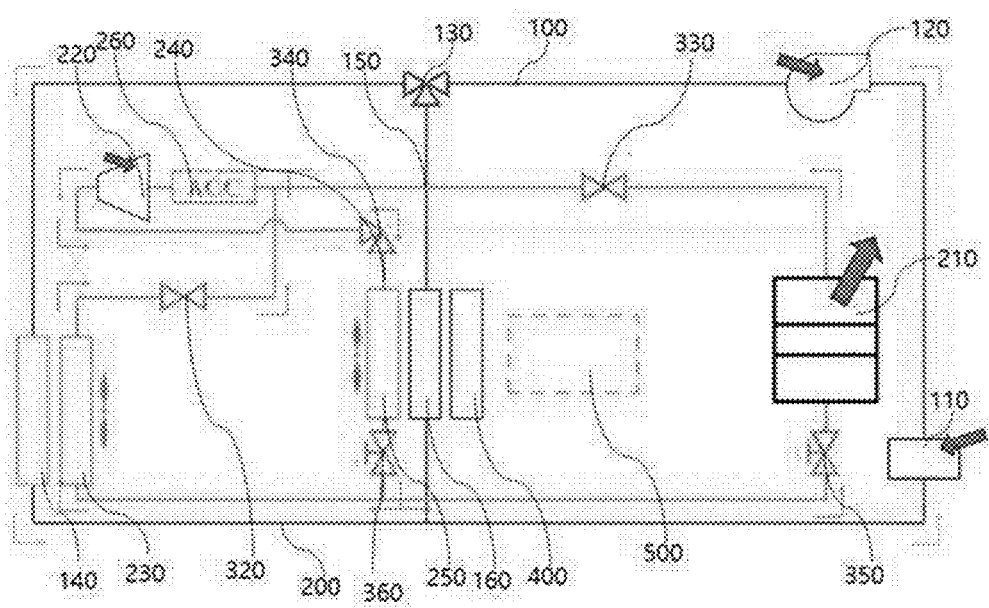

The embodiment in FIG. 12 results from adding an electric heater 400 to the embodiment in FIG. 11. The embodiment in FIG. 13 results from adding the first branch line 150 to the embodiment in FIG. 11. The embodiment in FIG. 14 results from adding the electric heater 400 to the embodiment in FIG. 13.

With the addition of the first branch line 150, the first refrigerant R1 that is temperature-increased the first circulation line 100 while passing by the electronic sub-assembly 110 and passes through the first compressor 120 undergoes the direct heat exchange through the circulation of air in the second heat exchanger 160. Thus, the energy efficiency of the vehicle can be increased.

FIGS. 15 to 20 illustrate the second circulation line 200 for cooling the electronic sub-assembly 110 and temperature-increasing the battery pack 210.

The first circulation line 110 through which the electronic sub-assembly 110 may be cooled is the same as the embodiment of the first circulation line 110 illustrated in FIG. 3, and thus the description thereof is omitted.

Figure 15:
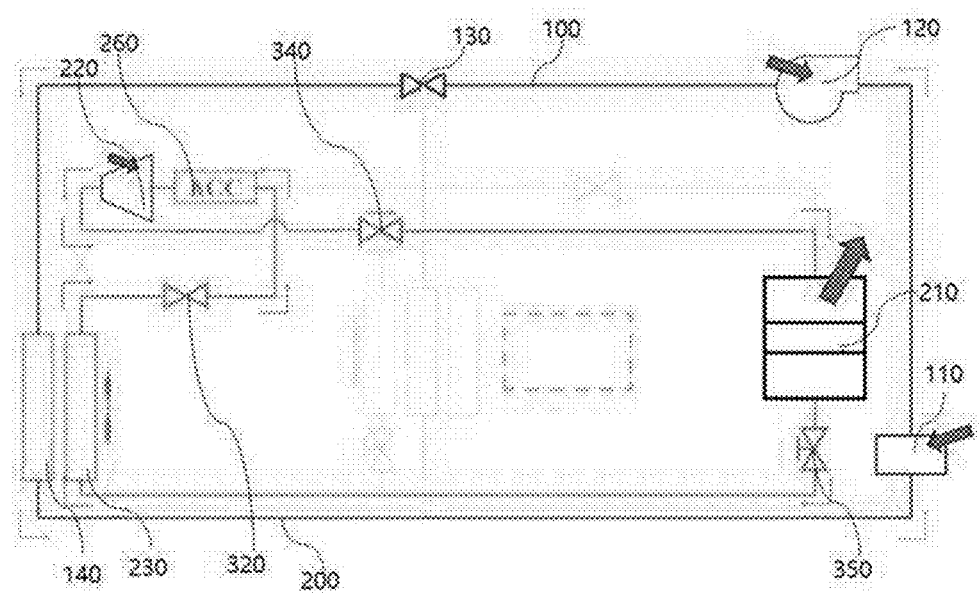
FIGS. 15 to 20 are views each illustrating the first circulation line and the second circulation line for temperature-increasing the battery pack using the battery pack thermal management system according to the present disclosure.

FIG. 15 illustrates the second circulation line 200 for temperature-increasing the battery pack 210. In a case where energy stored in the battery pack 210 is used to start the vehicle in winter in order to smoothly supply energy, the battery pack 210 is required to have a predetermined temperature or higher. In this case, the battery pack needs to be temperate-increased. In order to temperature-increase the battery pack 210, among the plurality of valves 300, the second opening and closing valve 320, the first expansion valve 350, and the second control valve 340 may be opened and the first opening and closing valve 310, the third opening and closing valve 330, and the second expansion valve 360 may be closed. The second control valve 340 may open a flow path providing a connection from the second compressor 220 to the battery pack 210. The second refrigerant R2 may circulate as follows. The second refrigerant R2 that increases in temperature and pressure while passing through the second compressor 220 temperature-increases the battery pack 210, then passes through the first expansion valve 350 and the condenser 230, and flows back into the second compressor 220.

Figure 16:
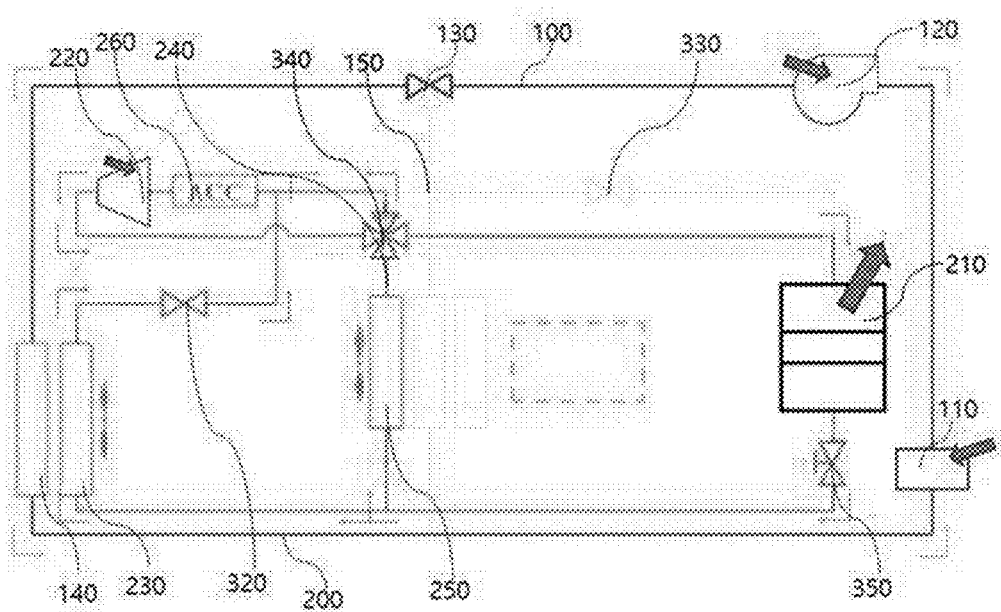

FIG. 16 illustrates the second circulation line 200 for temperature-increasing the battery pack 210 and air-cooling the in-vehicle passenger space 500.

The first circulation line 110 through which the electronic sub-assembly 110 may be cooled is the same as the embodiment of the first circulation line 110 illustrated in FIG. 3, and thus the description thereof is omitted.

The second refrigerant R2 temperature-increases the battery pack 210 and then flows, in a cooled state, into the second branch line 240. Thus, through the evaporator 250, the second refrigerant R2 may cool the in-vehicle passenger space 500. In the second circulation line 200 for temperature-increasing the battery pack 210, the second expansion valve 360 may be additionally opened, and the second control valve 340 may additionally open a flow path that provides a connection from the evaporator 250 to the second compressor 220. The second refrigerant R2 that cools the in-vehicle passenger space 500 may pass through the second control valve 340 and may flow into the second compressor 220.

FIGS. 17 to 20 illustrate the second circulation line 200 for temperature-increasing the battery pack 210 and air-heating the in-vehicle passenger space 500.

The first circulation line 110 through which the electronic sub-assembly 110 may be cooled is the same as the embodiment of the first circulation line 110 illustrated in FIG. 3, and thus the description thereof is omitted.

Figure 17:
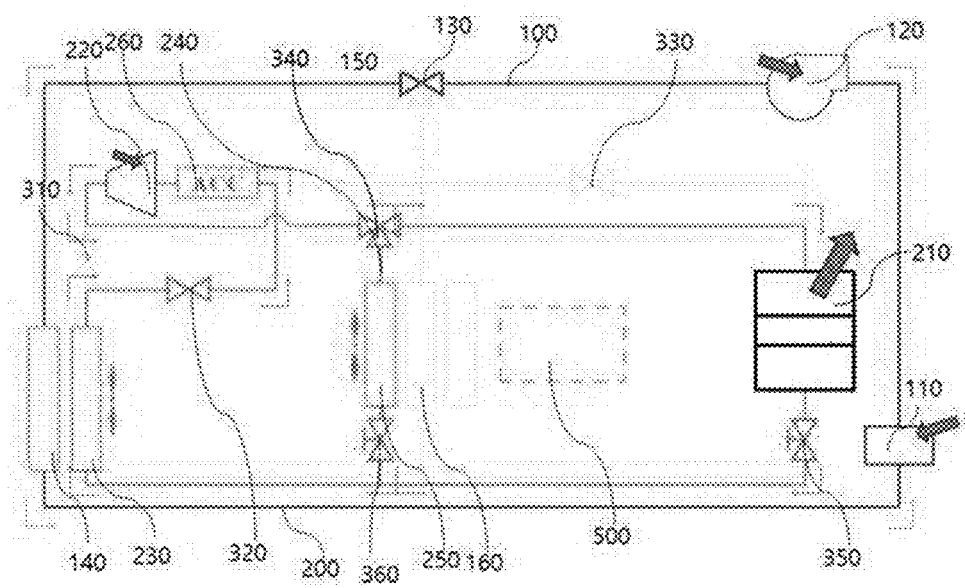
Figure 18:
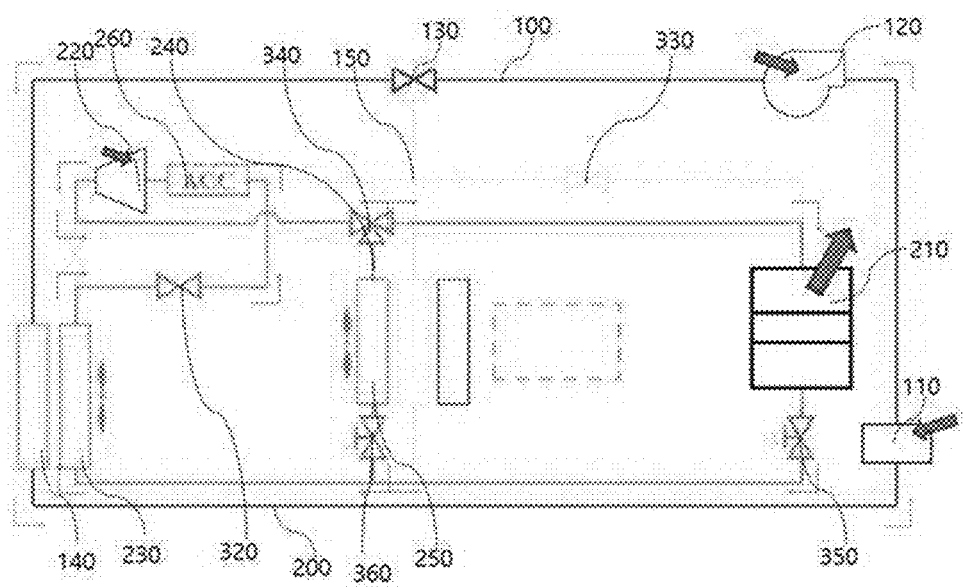
Figure 19:
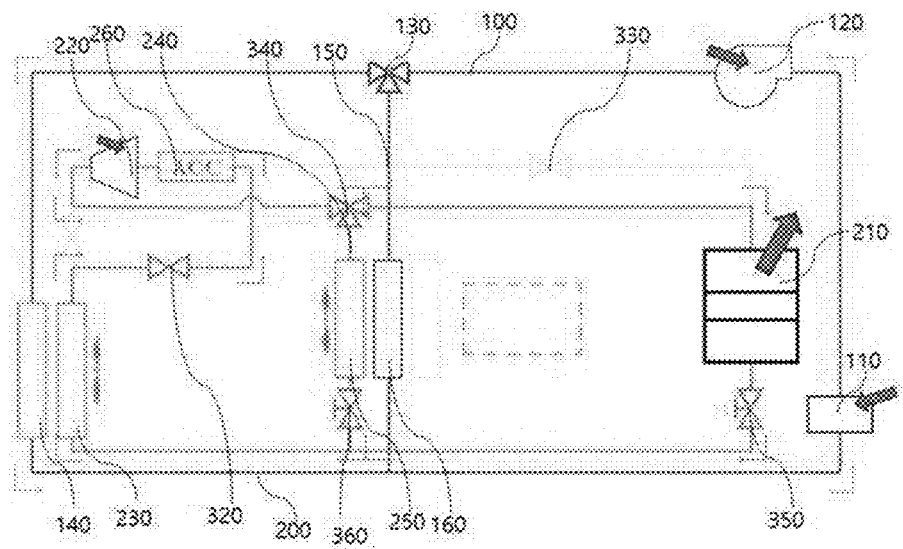

In the embodiment illustrated in FIG. 17, through the second circulation line 200, the battery pack 210 is temperature-increased. The embodiment illustrated in FIG. 18 results from adding the electric heater 400 to the embodiment illustrated in FIG. 17. The embodiment illustrated in FIG. 19 results from adding the first branch line 150 to the embodiment illustrated in FIG. 17. The embodiment illustrated in FIG. 20 results from adding the electric heater 400 to the embodiment illustrated in FIG. 19.

In the second circulation line 200 for temperature-increasing the battery pack 210, the second expansion valve 360 may be additionally opened, and the second control valve 340 may additionally open a flow path that provides a connection from the second compressor 220 to the evaporator 250.

The flow path in the second circulation line 200 for temperature-increasing the battery pack 210 may be a flow path along which the second refrigerant R2 circulates from the battery pack 210 to the condenser 230, then from the condenser 230 to the second compressor 220, and then from the second compressor 220 back into the battery pack 210. Therefore, the first opening and closing valve 310, the third opening and closing valve 330, and the first expansion valve 350 may be closed, and the second opening and closing valve 320 and the second control valve 340 may be opened. Particularly, the second control valve 340 may open a flow path from the second compressor 220 to the battery pack 210.

In the various embodiments, the battery pack thermal management system may include a processor (not illustrated). The processor may control the configuration of the battery pack thermal management system in order to realize the embodiments illustrated in FIGS. 3 to 20. The processor may control the first compressor 120, the first control valve 130, the first heat exchanger 140, the second heat exchanger 160, the second compressor 220, the condenser 230, the evaporator 250, the accumulator 260, the plurality of valves 300, and the electric heater 400. For example, the processor may control the plurality of valves 300 in such a manner as to be opened or closed.

The processor may control the configuration of the battery pack thermal management system according to a user's input or a predetermined condition. The predetermined condition may be associated with the temperature of the outside air, the temperature of the in-vehicle passenger space 500, or the temperature of the battery pack 210.

In the various embodiments, in a case where the temperature of the outside temperature is minus 7 degrees or lower Celsius, the processor (not illustrated) may control the configuration of the battery pack thermal management system in such a manner as to air-heat the in-vehicle passenger space 500. In the various embodiments, in a case where the temperature of the outside temperature is more than minus 7 degrees Celsius, the processor may control the configuration of the battery pack thermal management system in such a manner as to stop air-heating the in-vehicle passenger space 500.

In the various embodiments, in a case where the temperature of the outside temperature is 20 degrees or higher Celsius, the processor may control the configuration of the battery pack thermal management system in such a manner to air-cool the in-vehicle passenger space 500. In a case where the temperature of the outside air is less than 20 degrees Celsius, the processor may control the configuration of the battery pack thermal management system in such a manner as to stop air-cooling.

In the various embodiments, in a case where the temperature of the in-vehicle passenger space 500 is minus 7 degrees or lower Celsius, the processor may control the configuration of the battery pack thermal management system in such a manner as to air-heat the in-vehicle passenger space 500. In a case where the temperature of the in-vehicle passenger space 500 is more than minus 7 degrees Celsius, the processor may control the configuration of the battery pack thermal management system in such a manner as to stop air-heating the in-vehicle passenger space 500.

In the various embodiments, in a case where the temperature of the in-vehicle passenger space 500 is 20 degrees or higher Celsius, the processor may control the configuration of the battery pack thermal management system in such a manner as to air-cool the in-vehicle passenger space 500. In a case where the temperature of the in-vehicle passenger space 500 is less than 20 degrees Celsius, the processor may control the configuration of the battery pack thermal management system in such a manner as to stop air-cooling.

In the various embodiments, in a case where the temperature of the outside air is 15 degrees or lower Celsius, the processor may control the configuration of the battery pack thermal management system in such a manner as to air-heat the battery pack 210. In a case where the temperature of the outside air is more than 15 degrees Celsius, the processor may control the configuration of the battery pack thermal management system in such a manner as to stop air-heating the battery pack 210. In the case where the temperature of the outside air is more than 15 degrees Celsius, the processor may control the configuration of the battery pack thermal management system in such a manner as to cool the battery pack 210.

In the various embodiments, in the case where the temperature of the outside air is 15 degrees or lower Celsius, the processor may control the configuration of the battery pack thermal management system in such a manner as to air-heat the battery pack 210. In the case where the temperature of the outside air is more than 15 degrees Celsius, the processor may control the configuration of the battery pack thermal management system in such a manner as to stop air-heating the battery pack 210. In the case where the temperature of the outside air is more than 15 degrees Celsius, the processor may control the configuration of the battery pack thermal management system in such a manner as to cool the battery pack 210.

As in the various embodiments, according to an embodiment of the present disclosure, a battery pack thermal management system includes: a first circulation line in which, for circulation, a first refrigerant passing through a flow path on which an electronic sub-assembly is arranged passes by a first control valve, transfers heat in a first heat exchanger, and flows back into the flow path in which the electronic sub-assembly is arranged; a second circulation line connected to a battery pack, a second compressor, a condenser, and the battery pack and containing a second refrigerant; and a plurality of valves controlling a flow path along which the second refrigerant flows in the second circulation line. In the battery pack thermal management system, the battery pack is temperature-increased and cooled, depending on whether the plurality of valves are opened or closed.

As in the various embodiments, in the battery pack thermal management system, the plurality of valves include a second control valve, a first opening and closing valve, a second opening and closing valve, a third opening and closing valve, and a first expansion valve. The second control valve may be arranged between the second compressor and the battery pack, the first opening and closing valve may be arranged between the second compressor and the condenser, the second opening and closing valve may be arranged between the condenser and the second compressor, the third opening and closing valve may be arranged between the battery pack and the second compressor, and the first expansion valve may be arranged between the condenser and the battery pack.

As in the various embodiments, in the battery pack thermal management system, when the first opening and closing valve, the third opening and closing valve, and the first expansion valve are opened, the battery pack is cooled, and when the second opening and closing valve and the second control valve are opened, the battery pack may be temperature-increased.

As in the various embodiments, in the battery pack thermal management system, a first branch line branching off from the first control valve may be included in the first circulation line, a second heat exchanger may be arranged in the first branch line, and thus the first refrigerant may pass by the second heat exchanger and may circulate along a flow path on which the electronic sub-assembly is arranged.

As in the various embodiments, in the battery pack thermal management system, a second branch line branching off from the second control valve is included in the second circulation line, an evaporator may be arranged in the second branch line, and thus indirect heat exchange with the second heat exchanger may be performed.

As in the various embodiments, in the battery pack thermal management system, the battery pack thermal management system may further include a processor. In the battery pack thermal management system, the first circulation line may further include a first branch line branching off from the first control valve, the second circulation line may further include an evaporator and a second branch line branching off from the second control valve, and the processor may control the plurality of valves in such a manner that the second refrigerant circulates along the second circulation line in a manner that passes through the second compressor, the condenser, and the evaporator in this order.

As in the various embodiments, in the battery pack thermal management system, the processor may control the plurality of valves in such a manner that the second refrigerant circulates along the second circulation line in a manner that passes through the second compressor, the evaporator, and the condenser in this order.

As in the various embodiments, in the battery pack thermal management system, the second heat exchanger may be arranged in the first branch line, and the processor may control the plurality of valves so that the first refrigerant flows into the first branch line and circulates along the first circulation line in a manner that passes through the second heat exchanger, the electronic sub-assembly, and the first compressor in this order.

As in the various embodiments, in the battery pack thermal management system, the processor may control the plurality of valves so that the second refrigerant circulates along the second circulation line in a manner that passes through the compressor, the condenser, and the battery pack in this order.

As in the various embodiments, in the battery pack thermal management system, the processor may control the plurality of valves so that the second refrigerant circulates along the second circulation line in a manner that passes through the compressor, the battery pack, and the condenser in this order.

As in the various embodiments, in the battery pack thermal management system, when temperature of outside air is higher than first temperature, the processor may cool the battery pack and, when the temperature of the outside air is the first temperature or lower, may perform control in such a manner as to temperature-increase the battery pack.

As in the various embodiments, in the battery pack thermal management system, when temperature of the battery pack is higher than the first temperature, the processor may cool the battery pack and, when the temperature of the battery pack is the first temperature or lower, may perform control in such a manner as to temperature-increase the battery pack.

The embodiment of the present disclosure is described above, and the present disclosure is not limited to the embodiment. Amendments or alterations may be made to the embodiments without departing from the nature and gist of the present disclosure and the scope of the present disclosure, and it would be apparent to a person of ordinary skill in the art to which the present disclosure pertains that the amendments and the alternations are included within the scope of the present disclosure.

What is claimed is:

1. A battery pack thermal management system comprising:
    a first circulation line in which a first refrigerant circulates through a flow path on which a first compressor, a first heat exchanger, and an electronic sub-assembly are arranged passes by a first control valve, wherein the first refrigerant transfers heat in the first heat exchanger, cools the electronic sub-assembly, and returns to the flow path including the electronic sub-assembly;
    a second circulation line connected to a battery pack, a second compressor, and a condenser, and containing a second refrigerant flowing therethrough, wherein the battery pack is separated from the first circulation line;
    a plurality of valves controlling a flow path along which the second refrigerant flows in the second circulation line; and
    an accumulator disposed in the second circulation line and configured to allow the second refrigerant to pass therethrough before flowing into the second compressor,
    wherein the second refrigerant circulating through the second circulation line heats or cools the battery pack, depending on whether the plurality of valves are opened or closed,
    wherein the plurality of valves include a second control valve, a first opening and closing valve, a second opening and closing valve, a third opening and closing valve, and a first expansion valve, the second control valve is arranged between the second compressor and the battery pack, the first opening and closing valve is arranged between the second compressor and the condenser, the second opening and closing valve is arranged between the condenser and the second compressor, the third opening and closing valve is arranged between the battery pack and the second compressor, and the first expansion valve is arranged between the condenser and the battery pack.

2. The battery pack thermal management system of claim 1, wherein when the first opening and closing valve, the third opening and closing valve, and the first expansion valve are opened, the battery pack is cooled, and when the second opening and closing valve and the second control valve are opened, the battery pack is temperature-increased.

3. The battery pack thermal management system of claim 1, wherein a first branch line branching off from the first control valve is included in the first circulation line, a second heat exchanger is arranged in the first branch line, and thus the first refrigerant passes by the second heat exchanger and circulates along a flow path on which the electronic sub-assembly is arranged.

4. The battery pack thermal management system of claim 3, wherein a second branch line branching off from the second control valve is included in the second circulation line, an evaporator is arranged in the second branch line, and thus indirect heat exchange with the second heat exchanger is performed.

5. The battery pack thermal management system of claim 1, further comprising:
a processor,
wherein the first circulation line further comprises a first branch line branching off from the first control valve,
the second circulation line further comprises an evaporator and a second branch line branching off from the second control valve, and
the processor controls the plurality of valves in such a manner that the second refrigerant circulates along the second circulation line in a manner that passes through the second compressor, the condenser, and the evaporator in this order.

6. The battery pack thermal management system of claim 5, wherein the processor controls the plurality of valves in such a manner that the second refrigerant circulates along the second circulation line in a manner that passes through the second compressor, the evaporator, and the condenser in this order.

7. The battery pack thermal management system of claim 5, wherein a second heat exchanger is arranged in the first branch line, and the processor controls the plurality of valves so that the first refrigerant flows into the first branch line and circulates along the first circulation line in a manner that passes through the second heat exchanger, the electronic sub-assembly, and the first compressor in this order.

8. The battery pack thermal management system of claim 5, wherein the processor controls the plurality of valves so that the second refrigerant circulates along the second circulation line in a manner that passes through the second compressor, the condenser, and the battery pack in this order.

9. The battery pack thermal management system of claim 5, wherein the processor controls the plurality of valves so that the second refrigerant circulates along the second circulation line in a manner that passes through the compressor, the battery pack, and the condenser in this order.

10. The battery pack thermal management system of claim 5, wherein when temperature of outside air is higher than first temperature, the processor cools the battery pack and, when the temperature of the outside air is the first temperature or lower, performs control in such a manner as to temperature-increase the battery pack.

11. The battery pack thermal management system of claim 5, wherein when temperature of the battery pack is higher than the first temperature, the processor cools the battery pack and, when the temperature of the battery pack is the first temperature or lower, performs control in such a manner as to temperature-increase the battery pack.

* * * * *